Nov. 22, 1966  T. S. ZAJAC  3,286,731

ADJUSTABLE DAMPENING DEVICE

Filed April 10, 1964  2 Sheets-Sheet 1

INVENTOR.
THEODORE S. ZAJAC
BY
ATTORNEYS

Nov. 22, 1966 T. S. ZAJAC 3,286,731
ADJUSTABLE DAMPENING DEVICE
Filed April 10, 1964 2 Sheets-Sheet 2

*INVENTOR.*
THEODORE S. ZAJAC
BY
ATTORNEYS

United States Patent Office 3,286,731
Patented Nov. 22, 1966

3,286,731
ADJUSTABLE DAMPENING DEVICE
Theodore S. Zajac, Parma, Ohio, assignor to The Perry-Fay Company, a corporation of Ohio
Filed Apr. 10, 1964, Ser. No. 358,737
16 Claims. (Cl. 137—599)

My invention relates to dampening devices for dampening or snubbing shocks occurring in a fluid line.

An object of my invention is to provide improved means for protecting gauges and other instruments attached to a fluid line from shocks passing through the fluid toward the gauge or other instruments.

Another object is to provide an improved construction which provides a capillary type of passageway for fluid as it moves in a fluid line toward an instrument requiring protection from shocks in the fluid.

Another object is the provision for an adjustable snubber of this class which permits an adjustable variation in the amount of snubbing or dampening in the device to meet operating requirements.

Another object is the provision for giving a capillary coil type of construction in a snubber by a novel and economical arrangement.

Another object is the provision for incorporating and eliminating separate sections of a fluid passageway or capillary conduit so as to provide the required degree of snubbing action to the fluid in a line.

Another object is the provision for externally adjustable means for varying the degree of dampening or snubbing action required in the use of such a device.

Another object is to provide an improved device of the general character described which has no moving parts and which is well adapted for accommodating liquids, air and other gases.

Another object is the provision of an ingenious arrangement for affording positive shock protection for delicate gauges, switches or other instruments used in fluid power circuits.

Other objects and a fuller understanding of the invention may be had by referring to the following description and claims, taken in conjunction with the accompanying drawings, in which:

Figure 1:
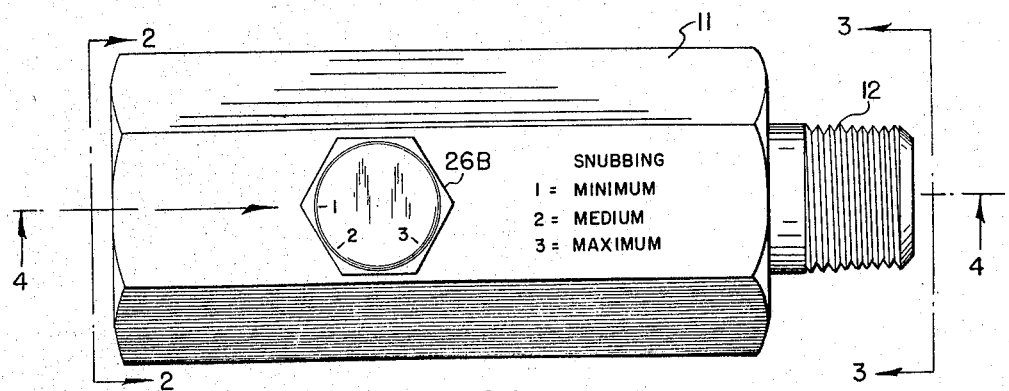
FIGURE 1 is an elevational view of my improved dampening device.
Figure 2:
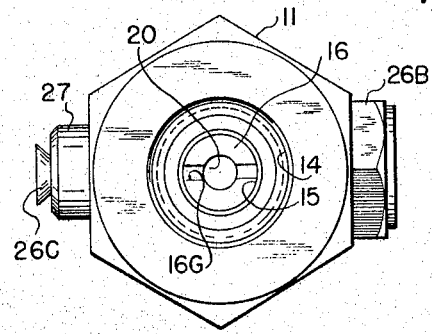
FIGURE 2 is an endwise view looking in the direction of the arrows 2—2 of FIGURE 1.
Figure 3:
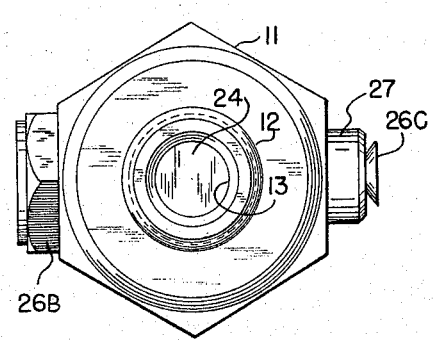
FIGURE 3 is an endwise view looking in the direction of the arrows 3—3 of FIGURE 1.
Figure 4:
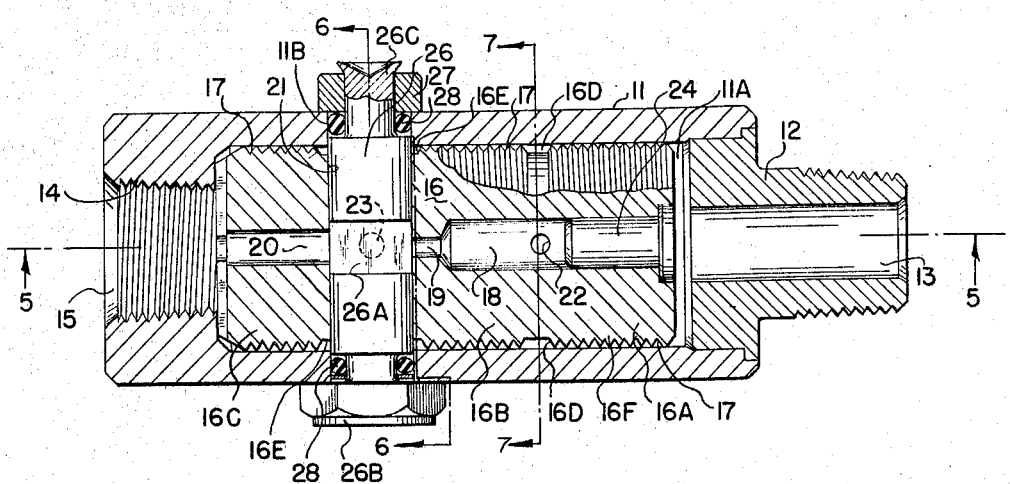
FIGURE 4 is a longitudinal sectional view taken through the line 4—4 of FIGURE 1.

My device has a hollow longitudinal body 11 having an internal bore 11A. This body 11 has connected thereto at its right-hand end in FIGURES 1, 4 and 5 a threaded inlet member 12 having male threads formed thereon for connection to a pipe, conduit or coupling. There is an inlet opening 13 provided in the inlet member 12 which communicates with the bore 11A within the body 11.

At the left-hand end of the body 11, there is an outlet portion 14 having internal threads formed thereon adapted to threadably engage with a pipe, tube or other coupling. An outlet opening 15 in axial alignment with the inlet opening 13 is adapted to communicate with the internal bore 11A of the body 11.

Snugly fitting within the bore 11A is a threaded core member 16. The internal wall of the bore 11A is smooth or unthreaded whereas the outer circumferential surface of the core member 16 is formed with threads 16F. These threads 16F form between the threads and the inner wall of the bore 11A a spirally disposed fluid passageway which is a capillary duct or conduit 17 extending spirally around the core member 16 and within the body 11.

The core member 16 is divided into three threaded sections 16A, 16B and 16C. The threaded section 16A is closest to the inlet 13, the threaded section 16B is intermediate the ends of the core member 16, and the threaded section 16C is at the end of the core member 16 closest to the outlet 15. A narrow annular groove 16D extending around the core member 16 divides the threaded section 16A from the threaded section 16B. A wide annular groove 16E divides the threaded section 16B from the threaded section 16C. At the left-hand end of the core member 16 there is a cross-notch 16G for accommodating a screwdriver or other tool. The core member 16 is tightly engaged in the body member 11 by a press fit or the like. It is inserted into the bore 11A prior to the assembly of the inlet member 12 with the body member 11. The inlet member 12 is secured by brazing or other suitable means to the right-hand end of the body member 11.

There is a first axially extending opening 18 in the core member 16. The end of the opening 18 closest to the inlet 13 is closed by a plug 24 whereby fluid from the inlet 13 is prevented from moving directly into the opening 18 in an axial direction. At the other or left-hand end of the core member 16 there is another axially directed opening 20 communicating with the outlet 15. An axial opening 19 of reduced diameter extends from the axial opening 18 toward the outlet 15.

Extending transversely through the core member 16, at right angles to the axis thereof, is a transverse opening 21. In alignment with the transverse opening 21 there is a transverse opening 11B through the opposite walls of the body member 11. As seen in the drawings, the openings 11B and 21 are in axial alignment with each other.

A lateral opening 22 extends radially outward of the opening 18 to the narrow annular groove 16D so as to provide communication therebetween, the opening 22 extending radially in only one direction from the axis of the core member 16.

A second lateral opening 23 extends radially outward from the transverse opening 21 and provides communication between the transverse opening 21 and the wide annular groove 16E, as illustrated.

Extending through the aligned openings 21 and 11B is a valving member or rotatable shaft 26. This valving member 26 has an actuating head 26B whereby rotation of the head 26B rotates the valving member 26 on its axis. At the opposite end of the valving member 26 there is a thick washer or nut 27 which is held to the outer end of the member 26 by means of the peened-over portion 26C. Thus, the member 26 is firmly held in position but is free to rotate on its axis. Suitable O-ring seals 28 are provided adjacent the opposite ends of the valving member 26 as illustrated.

Figure 5:
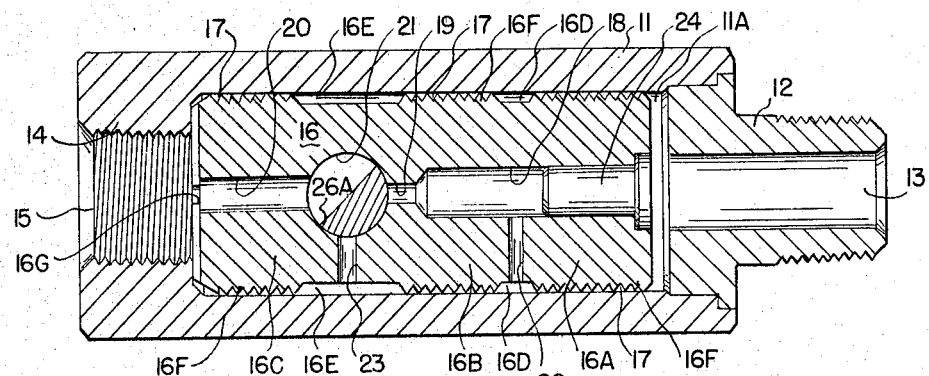
FIGURE 5 is a longitudinal sectional view taken through the line 5—5 of FIGURE 4, that is, a view wherein the device is rotated on its axis 90° from its position shown in FIGURE 4.
Figure 6:
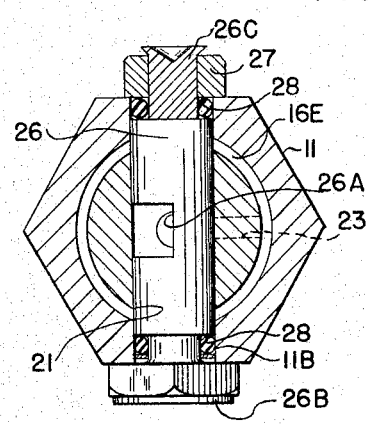
FIGURE 6 is a cross-sectional view taken through the line 6—6 of FIGURE 4.
Figure 7:
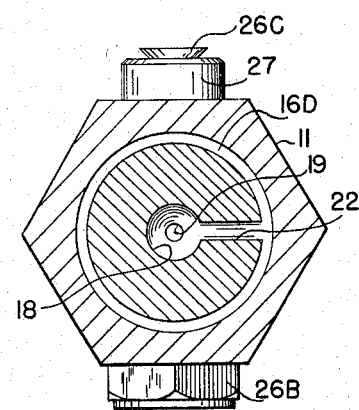
FIGURE 7 is a cross-sectional view taken through the line 7—7 of FIGURE 4.
Figure 8:
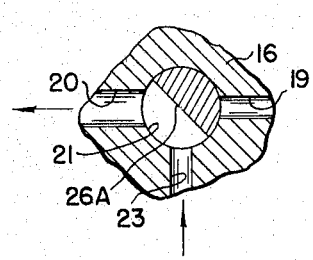
FIGURE 8 is a fragmentary sectional view illustrating the valving member in one position and varied from its position as shown in FIGURE 5.
Figure 9:
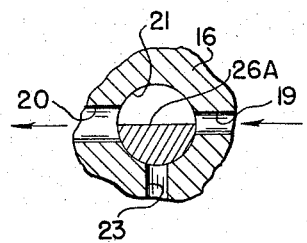
FIGURE 9 is a fragmentary sectional view showing the valving member in another alternative position and differing from its positions shown in FIGURES 5 and 8.

Intermediate the opposite ends of the valving member 26, the shaft or cylindrical portion thereof is cut away to form the flattened portion 26A. Thus the flattened portion 26A provides an opening transversely of the member 26 and this intermediate portion provides valving means for controlling the flow of fluid between openings 19, 20 and 23, depending upon the rotative position of the valving member 26. One position is illustrated in FIGURE 5. Another alternative position is illustrated in FIGURE 8. Another alternative position is illustrated in FIGURE 9. In its position illustrated in FIGURE 5, both of the openings 19 and 23 are closed so that no fluid may flow from either of them through the opening 20 to the outlet 15. Upon the valving member being rotated to its relative position illustrated in FIGURE 8, then fluid may flow through the lateral opening 23 up into the transverse opening 21, and out through the axial opening 20 to the outlet 15. When the valving member is rotated to its relative position illustrated in FIGURE 9, then the lateral opening 23 is closed and fluid may flow directly through the opening 19 from the axial opening 18, across the transverse opening 21 and out through the axial opening 20 to the outlet 15.

When the valving member 26 is in the position illustrated in FIGURE 5, then there is maximum snubbing or dampening action provided by the device. When in this position, fluid flowing from the inlet 13 must pass around through the capillary conduit 17 provided by the threads 16F on the threaded section 16A, thence around through the capillary conduit 17 provided by the threads 16F of the section 16B, and thence through the capillary conduit 17 provided by the threads 16F of the section 16C and thence out through the outlet 15.

When the valving member 26 is in the relative position illustrated in FIGURE 8, then a medium amount of snubbing or dampening action is obtained. In this arrangement fluid from the inlet 13 goes through the capillary conduit 17 provided by the threads 16F on both of the sections 16A and 16B, thence radially inward through the lateral opening 23 to the transverse opening 21, and thence out through the axial opening 20 to the outlet 15.

When the valving member 26 is in its relative position shown in FIGURE 9, then there is a minimum amount of snubbing or dampening action provided. In this position of the valving member, fluid from the inlet 13 flows through the capillary conduit 17 provided between threads 16F of the section 16A only and thence radially inward through the lateral opening 22, thence through the axial opening 18 and axial opening 19, across the transverse opening 21 and through the axial opening 20 to the outlet 15.

When the valving member 26 is turned so as to permit free passage of the fluid, then the fluid in taking the path of least resistance flows through the communicating openings in preference to the fine capillary conduit 17 provided by the spirally disposed threads around the core member 16. For example, when the valving member 26 is in its position shown in FIGURE 8, then the fluid tends to pass through the openings 23, 21 and 20 to the outlet rather than being forced through the circuitous path which would be required in passing between the threads of the section 16C. Therefore, the variation in the snubbing action is determined by selecting appropriate by-passes for the fluid whereby in some instances the capillary conduits provided by the threads are by-passed or the fluid is required to pass therethrough.

It is seen that a rugged and efficient dampening or snubbing device is here provided and also that greater flexibility and variation is permitted in the use of such devices. Fewer or greater numbers of threaded sections may be incorporated so as to obtain greater or less permissible variations in the use of the device.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A device for dampening shock in the fluid of a fluid line comprising the combination of a body member having a bore therein and an inlet and outlet communicating with said bore, a core member mounted in said bore in axial alignment therewith and between said inlet and outlet, the external wall of said core member and the internal wall of said bore having a spirally disposed fluid path extending therealong defined by a threaded surface formed on one of said walls and an unthreaded surface on the other of said walls, the crest of the threads on the said threaded surface engaging the said unthreaded surface, said fluid path being divided by a groove in the core member at a location intermediate its ends into a plurality of sections along said core member, by-pass means communicating with said groove and extending through said core member from said fluid path intermediate said inlet and outlet, said by-pass means providing lesser resistance to flow of fluid therethrough than through said fluid path, adjustable gate means positioned athwart said by-pass means for selectively controlling communication through said by-pass means to select the sections to be by-passed through said by-pass means from said fluid path from said inlet to said outlet, and actuating means extending into the body member and core member for adjusting the operative position of said gate means from the exterior of said body member.

2. A device as claimed in claim 1 and in which said by-pass means include an axially disposed opening in the core member and a radially disposed opening in the core member extending between the axially disposed opening and said fluid path at said location intermediate of sections of the fluid path, and in which said gate means includes a needle member rotatively mounted in the core member and disposed athwart the said axially disposed opening and arranged to control communication therethrough by blocking the same in a degree determined by the rotative position of the needle member in the core member, the needle member being rotatable to selected blocking positions by said actuating means.

3. A shock-dampening device for connection in a fluid line to dampen shocks in the fluid on the inlet side of the device, comprising in combination a body having an axially extending bore therein and an inlet and outlet at opposite ends thereof communicating with said bore, a generally cylindrical core member disposed axially in said bore, the outer cylindrical wall of said core member being in tight-fitting engagement with the inner cylindrical wall of said bore, one of said walls being threaded to provide a spiral groove therealong providing a spirally disposed capillary fluid pathway between said body and core member, a first opening disposed longitudinally of the core member, a second opening extending laterally outwardly from said first opening and providing communication between the first opening and the inner wall of said bore at a location intermediate the ends of said threaded wall between longitudinally divided sections of said fluid passageway, and a valving member disposed in said core member and extended into said first opening, said valving member extending outwardly of said body to be actuated from without the body, said valving member being formed to control the degree of communication through said openings from said inlet to outlet, the degree of communication through said openings from said inlet to outlet determining the sections of said capillary fluid pathway through which fluid is required to travel from said inlet to said outlet.

4. A device as claimed in claim 3 and in which said core member has a plurality of openings extending laterally outwardly from said first opening and providing communication between said first opening and the inner wall of said bore at a plurality of locations, respectively, intermediate the ends of said threaded wall between longitudinally divided sections of said fluid passageway.

5. A device as claimed in claim 3 and in which said valving member is a rotatable round shaft having a flattened portion disposed athwart said first opening to control the flow of fluid therethrough by the degree of angular disposition of said flattened portion to the axis of said first opening.

6. A snubber for connection in a fluid line for protecting a fluid-responsive device from shock transmitted in the fluid, comprising the combination of a hollow body member having an axially extending bore therein communicating with an inlet and an outlet, a core member disposed axially in said bore intermediate said inlet and outlet, said core member having a threaded outer cylindrical surface in engagement with the opposed internal wall of said bore, the threaded surface in conjunction with said internal wall providing a spiral capillary fluid passageway between the opposed walls of the core member and body member, a longitudinally extending opening in said core member communicating with one of said outlet and inlet, a laterally extending opening in said core member communicating with said longitudinally extending opening and with said spiral fluid passageway at a location intermediate the ends thereof, said openings providing by-pass means in said core member, a valving member extending into said by-pass means for controlling the degree of communication therethrough between said spiral fluid passageway at said location and said one of said inlet and outlet, and adjustable means extending outwardly of said core member and body member for controlling the operative position of said valving member, the degree of communication through said by-pass conduit determining the portion of the said spiral fluid passageway through which shocks in said fluid are required to travel in moving from said inlet to said outlet.

7. A snubber as claimed in claim 6 and including in said by-pass means a plurality of laterally extending openings communicating with said longitudinally extending opening and with said spiral fluid passageway at a plurality of locations, respectively, intermediate the ends thereof, and in which said valving member is constructed for controlling the degree of communication through the by-pass means via each of said laterally extending openings to the spiral fluid passageway at the respective locations.

8. A snubber as claimed in claim 6 and in which said valving member is a shaft extending transversely through the core member and body member and having a non-round portion disposed athwart the by-pass means, the degree of communication through the by-pass means being determined by the angular disposition of said non-round portion relative to the by-pass means as set by the rotative adjustment of said shaft.

9. A snubber for dampening shocks in a fluid line comprising a hollow body member having a cylindrical bore communicating with an inlet and outlet, a cylindrical core member axially mounted in said bore, said core member and said bore having opposed cylindrical walls, one of said walls being threaded to provide a spiral passageway defined by the opposed sides of adjacent of the screw threads and the other of said walls, conduit means extending through said core member and communicating with one of said inlet and outlet and with said spiral passageway intermediate its ends to divide the spiral passageway into a plurality of longitudinally separated sections, and valve means extending into said conduit means for controlling the degree of communication therethrough, the said degree of communication through the conduit means determining the number of said sections of the spiral passageway through which shocks in the fluid must pass in being transmitted through the body member.

10. A snubber as claimed in claim 9 and in which said conduit means communicates with said spiral passageway at a plurality of spaced locations therealong intermediate its ends to divide the spiral passageway into more than two longitudinally separated sections, and in which said valve means includes selective valve means for selecting between said spaced locations for communication with said one of the inlet and outlet, said selection determining the comparative degree of communication through said conduit.

11. A fluid snubber for dampening shocks in the fluid in a fluid line comprising a hollow body having a bore communicating with an inlet and outlet, a central core member axially mounted in said bore, capillary fluid passageway means spirally disposed between opposed walls of said core member and said body member, said fluid passageway being divided longitudinally of the core member into a plurality of longitudinally separated sections, conduit means in said core member communicating with said fluid passageway between said sections and with one of said inlet and outlet, and valve means for controlling flow of fluid through the conduit means for determining the number of said sections to be by-passed by fluid passing directly through said conduit means.

12. A fluid snubber as claimed in claim 11 and in which said conduit means communicates with said fluid passageway at a plurality of locations along the longitudinal length of the core member to provide more than two of said longitudinally separated sections.

13. A device for dampening shock in the fluid of a fluid line comprising the combination of a body member having a bore therein and an inlet and outlet communicating with said bore, a core member mounted in said bore in axial alignment therewith and between said inlet and outlet, the external wall of said core member and the internal wall of said bore having a spirally disposed fluid path extending therealong defined by a threaded surface formed on one of said walls and an unthreaded surface on the other of said walls, the crest of the threads on the threaded surface engaging said unthreaded surface, the fluid path being between and along said threads, port means carried by said body member and opening into said fluid path intermediate the ends thereof to thereby divide the fluid path into a plurality of sections arranged in series, conduit means carried by the body member providing communication between said port means and said outlet, and valve means carried by the body member for controlling flow of fluid through the conduit means to divert selectively flow of fluid through the conduit means from the port means and thereby avoid as desired the resistance offered by the said fluid path between the port means and said outlet.

14. A device as claimed in claim 13 and in which the threaded surface is formed on the external wall of the core member.

15. A fluid snubber for dampening shocks in the fluid in a fluid line comprising a hollow body having a bore communicating with an inlet and an outlet, a core member axially disposed in said bore, the core member having an outer cylindrical wall and the bore having an inner cylindrical wall facing in opposition the outer cylindrical wall of the core member, said oppositely facing walls between them forming a spiral fluid passageway extending around the core member to provide communication between the inlet and outlet, the said fluid passageway being defined by a spiral groove extending around and intermediate said oppositely facing walls, first means carried by the core member interrupting the spiral fluid passageway into portions arranged in series, second means providing communication through the core member between said first means and said outlet, and third means extended into the core member for selectively diverting flow of fluid through the second means from said first means to said outlet to avoid the resistance along the spiral fluid passageway between said first means and said outlet.

16. A fluid snubber as claimed in claim 15 and in which said spiral groove is formed in said core member.

References Cited by the Examiner
UNITED STATES PATENTS

| | | | |
|---|---|---|---|
| 1,162,982 | 12/1915 | Crocker | 73—392 X |
| 2,013,316 | 9/1935 | McLean | 138—42 X |
| 2,897,675 | 8/1959 | Kocher et al. | 73—392 X |

ALAN COHAN, *Primary Examiner.*

D. LAMBERT, *Assistant Examiner.*